US012641529B2

(12) United States Patent
Wong et al.

(10) Patent No.: US 12,641,529 B2
(45) Date of Patent: May 26, 2026

(54) SYSTEM AND METHOD FOR A PERIPHERAL DEVICE OUT-OF-BOX EXPERIENCE RADIO FREQUENCY/BLUETOOTH SMART CONNECT

(71) Applicant: Dell Products, LP, Round Rock, TX (US)

(72) Inventors: Kai Leong Wong, Singapore (SG); Manish Krishnaji Desai, Singapore (SG); Harpreet Narula, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 355 days.

(21) Appl. No.: 18/538,491

(22) Filed: Dec. 13, 2023

(65) Prior Publication Data

US 2025/0203494 A1    Jun. 19, 2025

(51) Int. Cl.
*H04W 48/16* (2009.01)
*H04W 48/14* (2009.01)

(52) U.S. Cl.
CPC ........... *H04W 48/16* (2013.01); *H04W 48/14* (2013.01)

(58) Field of Classification Search
CPC .............................. H04W 48/16; H04W 48/14
See application file for complete search history.

(56) References Cited

U.S. PATENT DOCUMENTS

| | | | |
|---|---|---|---|
| 11,758,598 B1 | 9/2023 | Narula | |
| 2017/0075405 A1 | 3/2017 | Jensen | |
| 2017/0078300 A1 | 3/2017 | He | |
| 2017/0180916 A1 | 6/2017 | Jakusovszky | |
| 2020/0077246 A1 | 3/2020 | Mars | |
| 2023/0136293 A1* | 5/2023 | Pierson | ................. H04W 12/50 726/7 |
| 2023/0188934 A1 | 6/2023 | Chung | |
| 2023/0354014 A1 | 11/2023 | Narula | |

* cited by examiner

*Primary Examiner* — Natasha W Cosme
(74) *Attorney, Agent, or Firm* — Prol Intellectual Property Law, PLLC; H. Kenneth Prol

(57) ABSTRACT

A wireless peripheral device includes a microcontroller, a memory device, and a peripheral device power management unit to provide power to the hardware processor and memory device. The microcontroller executes code instructions of an out-of-box auto-connection discovery agent to automatically select and couple the wireless peripheral device to an information handling system upon initially powering up by iteratively initiating a first wireless connection request beacon via a first wireless protocol and initiating a second wireless connection request beacon via a second wireless protocol different from the first wireless protocol when the peripheral device is not wirelessly coupled to the information handling system using the first wireless protocol, wherein the microcontroller sets an auto-connection timer to time out the iterative switching back and forth between the first wireless protocol and second wireless protocol when no wireless connection is established between the wireless peripheral device and the information handling system.

20 Claims, 4 Drawing Sheets

SYSTEM AND METHOD FOR A PERIPHERAL DEVICE OUT-OF-BOX EXPERIENCE RADIO FREQUENCY/BLUETOOTH SMART CONNECT

FIELD OF THE DISCLOSURE

The present disclosure generally relates to a system to operatively couple a peripheral device to an information handling system. The present disclosure more specifically relates to a system to operatively couple a peripheral device to an information handling system using a plurality of wireless protocols.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include a radio to operatively couple one or more peripheral devices to an information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
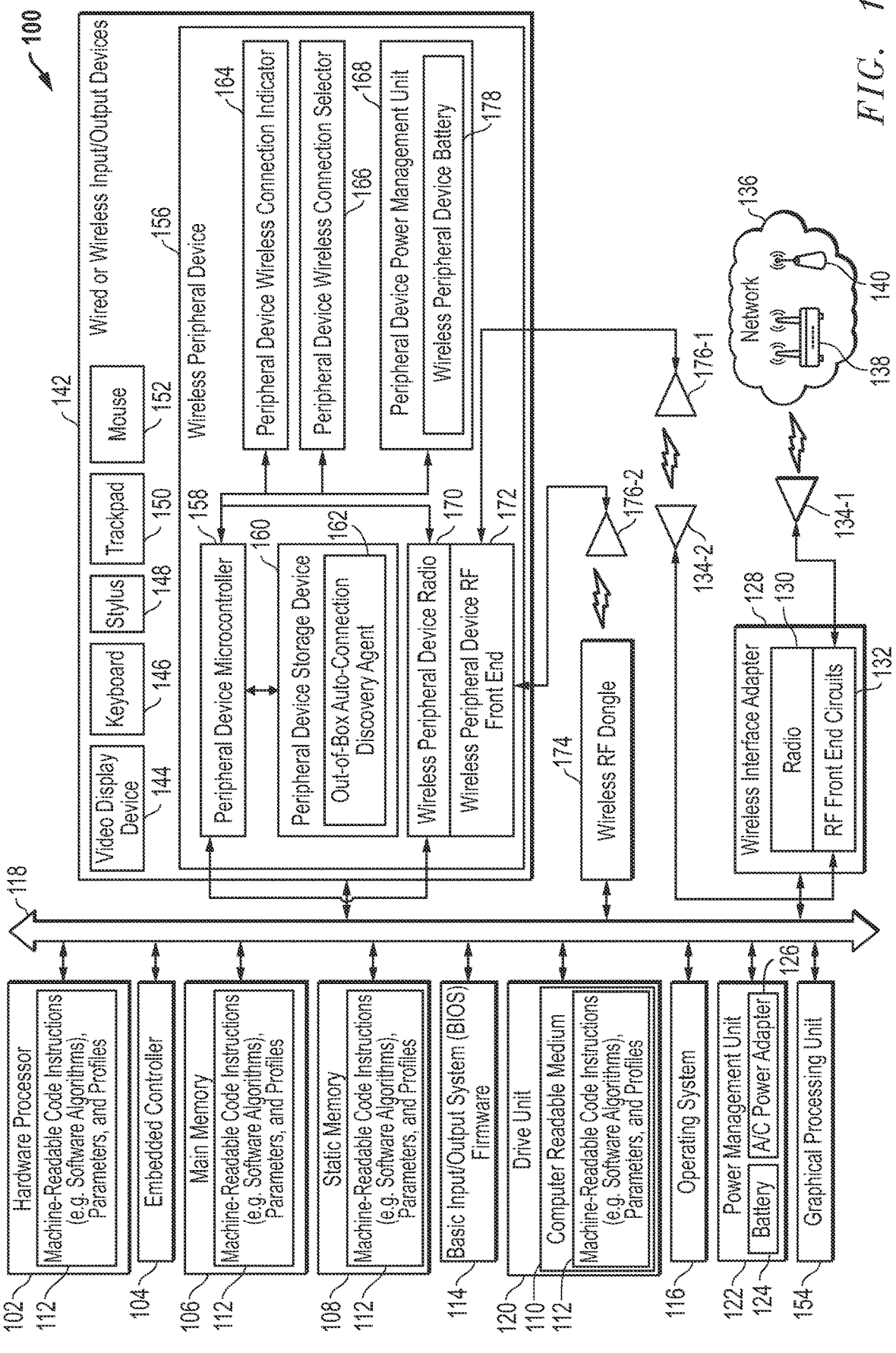
FIG. 1 is a block diagram illustrating an information handling system with a peripheral device executing an out-of-box auto-connection discovery agent and operatively couplable to the information handling system using one of two different wireless protocols according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allows a user to provide input to the information handling system and receive output from the information handling system. These peripheral devices may be wirelessly couplable to the information handling system through the use of various radio frequency (RF) radios in the information handling system and the peripheral device.

These wireless peripheral devices require additional steps by the user in order to setup the peripheral device to be operatively coupled to the information handling system. These additional steps may include researching within a user manual or "quick" connect manual, for example, how to set the peripheral device up and operatively couple the peripheral device to the information handling system. Such a manual pairing and connecting set of steps may be tiresome and reduce a user's satisfaction with initial set up of the wireless peripheral device with an information handling system. Some of these steps may be skipped or missed by the user resulting in improper or incomplete coupling of the peripheral device to the information handling system, for example. In some peripheral devices, a button or other actuation device may be provided to allow the user to select which wireless protocol to use to operatively couple the information handling system. The necessary use of this button may lead to confusion by the user and may not provide the best wireless connection between the peripheral device and the information handling system. Further, a preset factory default wireless protocol may not be a user-preferred connection mode and potential interference between peripheral devices operatively coupled to the information handling system.

The present specification describes a system and method that allows for a user to initiate the peripheral device, out of the box, and cause the peripheral device to automatically couple to the information handling system. In an embodiment, a user-selection option may also be provided to the user who, knowing which wireless protocol to use to operatively couple the peripheral device to the information handling system, may select a user-desired wireless protocol. In an embodiment, a wireless peripheral device includes a microcontroller, a memory device, and a peripheral device power management unit (PMU) to provide power to the hardware processor and memory device. In an embodiment, the peripheral device also includes a microcontroller to execute an out-of-box auto-connection discovery agent to automatically couple the peripheral device to an information handling system. The execution of the out-of-box auto-connection discovery agent may iteratively initiate one or more first wireless beacons for a first wireless connection request via a first wireless protocol and initiate one or more second wireless beacons for a second wireless connection request via a second wireless protocol different from the first wireless protocol when the peripheral device is not wirelessly coupled to the information handling system using the first wireless protocol. In an embodiment, the microcontroller sets an auto-connection timer to time out the iterative switching between the first wireless connection and second wireless connection when no wireless connection is established between the peripheral device and the information handling system. More than two wireless protocols may also be polled via beacons for additional wireless connection requests in some embodiments.

In an embodiment, the peripheral device may also include a peripheral device wireless connection indicator formed onto a housing of the peripheral device indicating which of the first wireless protocol or second wireless protocol or other wireless protocols are being used to initiate and operatively couple the peripheral device to the information handling system. The peripheral device may also include a peripheral device wireless connection selector to receive input from a user to select one of the first wireless protocol and second wireless protocol or other wireless protocols to operatively couple the peripheral device to the information handling system and stop the out-of-box auto-connection discovery agent from automatically coupling the peripheral device to the information handling system.

The first wireless protocol and the second wireless protocol or other wireless protocols may be different wireless protocols or even be in different frequency bands in various embodiments. In an embodiment, the first wireless protocol is a radio frequency (RF) protocol used by a dongle operatively coupled to the information handling system and may be a proprietary RF protocol for a wireless personal area network (WPAN) or wireless local area network (WLAN). In an embodiment, the second wireless protocol is a Bluetooth® (BT) wireless protocol such as Bluetooth® Low Energy (BLE) protocol under the Bluetooth Special Interest Group (Bluetooth SIG) standard such as IEEE 802.15 or may be another short-range wireless personal area network standard.

In one example embodiment, the out-of-box auto-connection discovery agent may cycle beacons between two available wireless protocols on the wireless peripheral device that is powered up for the first time. In such an embodiment, the microcontroller may set a first timeout timer such that exceeding the first timeout timer automatically causes the microcontroller to switch from initiating a beacon or beacons for the first wireless connection request to initiating the second wireless connection request. Additionally, in such an embodiment, the microcontroller may set a second timeout timer such that exceeding the second timeout timer automatically causes the microcontroller to switch from initiating a beacon or beacons for the second wireless connection request to initiating the first wireless connection request. These two timers may set a specific time which each wireless protocol is attempted to be accessed by the wireless peripheral device until the next wireless protocol is used to attempt to operatively couple the wireless peripheral device to the information handling system. In an embodiment, where the auto-connection timer has timed out, the microcontroller may place the wireless peripheral device into a sleep state awaiting for a wake action where the execution an out-of-box auto-connection discovery agent by the microcontroller may reset the auto-connection timer and iteratively attempt to couple the wireless peripheral device to the information handling system via the first or second wireless protocols.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142 that are wired or wireless, such as a mouse 152, a trackpad 150, a keyboard 146, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other processing device. The information handling system 100 may also include one or more buses 118 operable to transmit communications between the various hardware components such as any combination of various wired or wireless I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as a keyboard 146, a mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 that allows the user to interface with the information handling system 100 via the video/graphics display device 144, a cursor control device (e.g., a trackpad 150, or gesture or touch screen input), a stylus 148, and/or a keyboard 146, a mouse 152, among others. Various drivers and control electronics may be operatively coupled to operate the I/O devices 142 according to the embodiments described herein. The present specification contemplates that the I/O devices 142 may be wired or wireless via a wireless connection using a wireless peripheral device radio 172 and wireless peripheral device antenna 176-1, 176-2.

A network interface device of the information handling system 100 shown as wireless interface adapter 128 can provide connectivity among devices such as with Bluetooth® under the Bluetooth Special Interest Group (Bluetooth SIG) standard such as IEEE 802.15 or may be another short-range wireless personal area network standard, or to a network 136, e.g., a wide area network (WAN), a local area network (LAN), wireless local area network (WLAN), a wireless personal area network (WPAN), a wireless wide area network (WWAN), or other network. In embodiments described herein, the wireless interface device 128 with its radio 130, RF front end 132 and antennas 134-1, 134-2 is used to communicate with the wireless peripheral devices via, for example, a Bluetooth® or Bluetooth® Low Energy (BLE) protocols at, for example, 2.4 GHz or 6 GHZ frequencies. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be operatively coupled to a wireless peripheral device 156. The peripheral device 156 described herein may be any type of wireless peripheral device. Example wireless peripheral devices may include a wireless mouse 152, a wireless trackpad 150, wireless stylus 148, a wireless keyboard 146, a wireless video display device 144, and the like. The present specification contemplates that any other types of wireless peripheral device 156 may be used and the processes, systems, and methods may equally apply to the automatic coupling of these wireless peripheral devices 156 to an information handling system 100 as described herein. For ease of understanding and description, the present specification may describe the wireless peripheral device 156 as a wireless mouse 152 and/or a wireless keyboard 146.

In an embodiment, the wireless peripheral device 156 includes a wireless peripheral device radio 170, wireless peripheral device RF front end 172, and one or more wireless device antennas 176-1, 176-2 used to communicate with the information handling system 100. The wireless peripheral device 156 includes a peripheral device microcontroller 158 for executing code instructions of an out-of-box auto-connection discovery agent 162 according to embodiments herein. According to the operation of the out-of-box auto-connection discovery agent 162 as described herein, one of the wireless device antennas 176-1, 176-2 may be used to operatively couple the wireless peripheral device 156 to the information handling system 100 using one of a plurality of wireless protocols. These wireless protocols may include a Bluetooth® (BT) wireless protocol, radio frequency (RF) protocol, or any other type of short distance WPAN protocol used to operatively couple the wireless peripheral device 156 to the information handling system 100.

The execution of code instructions for the out-of-box auto-connection discovery agent 162 may execute to emit beacons via wireless peripheral device antennas 176- and 176-2 or others in alternate cycled intervals of time to detect a selection of a wireless protocol type and engage in pairing and wireless coupling with a selected wireless protocol. For example, the Bluetooth wireless protocol may include any of a classic Bluetooth® protocol, a Bluetooth® Low Energy (BLE), or other types of Bluetooth® (BT) protocols or other short distance WPAN protocols. In an embodiment, the information handling system 100 may or may not include a wireless interface adapter 128 that includes a BT-capable radio 130, RF front end 132, and antenna 134-1, 134-2. The wireless peripheral device radio 170 and wireless peripheral device RF front end 172 may, therefore, communicate with this BT capable circuitry in the information handling system 100 using one of the plurality of wireless peripheral device antennas 176-1, 176-2 housed within the housing of the wireless peripheral device 156. In an embodiment, when the wireless peripheral device 156 is operatively coupled to the information handling system 100 via a BT connection, the wireless peripheral device 156 may communicate with the information handling system 100 using any band, channel, and/or radio frequency associated with the BT or BLE communication protocols including, but not limited to, a radio frequency spectrum in the 2.402 GHz to 2.480 GHz range as well as other current or anticipated BT and BLE frequencies. In an embodiment, when the wireless peripheral device 156 is operatively coupled to the information handling system 100 via an RF protocol such as proprietary wireless WPAN or WLAN protocol such as Dell Pair® or Microsoft® Swift Pair® or another wireless RF protocol such as 5G WPAN or others. The wireless peripheral device radio 170, wireless peripheral device RF front end 172, and wireless device antennas 176-1, 176-2 may communicate with a wireless RF dongle 174 operating the proprietary RF protocol that may include an internal antenna (not shown) capable of communicating with the wireless peripheral device radio 170. It is appreciated that, in one embodiment, the RF discovery process involved between the wireless peripheral device 156 and the information handling system 100 comprises the wireless peripheral device 156 acknowledging the connection between the wireless peripheral device 156 and the information handing system 100 as a result of the RF dongle 174 being pre-paired with the wireless mouse prior to shipping of the wireless mouse and RF dongle 174. As such, the operative wireless coupling of the wireless peripheral device 156 to the information handling system 100 is a result of this pre-pairing process such that, where available, the RF dongle 174 may acknowledge the connection between the wireless peripheral device 156 and information handling system 100 without initiating a typical pairing process. It is appreciated that, in some embodiments, a wireless RF dongle 174 may not be used and the information handling system 100 may communicate with the wireless peripheral device 156 via an RF antenna (e.g., one or more of antennas 134-1, 134-2) operatively coupled to the radio 130 and RF front end 132 of the information handling system 100. The RF protocol may also include Wi-Fi®, near-field communication (NFC) protocol, or the like. It is appreciated, however, that the wireless communication protocols associated with the BT wireless protocol and the RF protocol implement different communication standards that set each apart from each other by the hardware processor (e.g., EC 104, hardware processor 102, etc.) when the wireless peripheral device 156 is transceiving data with the information handling system 100. The usable frequencies associated with the RF protocol may include radio bands from 2.400 to 2.485 GHz, 5 GHz, and 6 GHz among other WLAN radio frequency bands.

The wireless peripheral device 156 also includes a peripheral device PMU 168. For example, the peripheral device PMU 168 may provide power to the peripheral device microcontroller 158 and a peripheral device storage device 160 as well as other hardware such an optical sensor that detects position changes of a wireless mouse as the wireless peripheral device 156 and the like. In an embodiment, the peripheral device PMU 168 may monitor power levels and be electrically coupled to the peripheral device microcontroller 158 to provide this power. The peripheral device PMU 168 may receive data or machine-readable code instructions to regulate power from a power source such as a wireless peripheral device battery 178.

The peripheral device microcontroller 158, as described herein, also includes a peripheral device storage device 160. The peripheral device storage device 160 may be any type of data storage device that, in the embodiments herein, stores the out-of-box auto-connection discovery agent 162 to be executed by the peripheral device microcontroller 158. Execution of the out-of-box auto-connection discovery agent 162 causes the wireless peripheral device 156 to iteratively initiate a first wireless connection request via a first wireless protocol and initiate a second wireless connection request via a second wireless protocol different from the first wireless protocol when the peripheral device is not wirelessly coupled to the information handling system using the first wireless protocol. As described in embodiments herein, the first wireless protocol may be a proprietary RF protocol while the second wireless protocol is a Bluetooth wireless protocol. In an embodiment, the selection of initiating, first, a wireless connection using a RF protocol may be done due to the relatively quicker determination as to whether the wireless peripheral device 156 can be operatively coupled to the information handling system 100 than when using a Bluetooth wireless protocol to make that operative coupling.

In an embodiment, the execution of the out-of-box auto-connection discovery agent 162 may initiate an auto-connect timer. The auto-connect timer may be set to determine a length of time that the wireless peripheral device 156 iteratively attempts to initiate a first wireless connection via the first wireless protocol and initiate a second wireless connection via the second wireless protocol. In an embodiment, the auto connect timer may be set to 180 seconds. However, any length of time may be set as the auto-connect timer and the present specification contemplates these other set lengths of time. In an example embodiment, where no connection is made between the wireless peripheral device 156 and the information handling system 100 using either of the first wireless protocol or second wireless protocol to other wireless protocol, the execution of the out-of-box auto-connection discovery agent 162 may cause the peripheral device microcontroller 158 to place the wireless peripheral device 156 in a sleep state. However, where a wireless connection is made between the wireless peripheral device 156 and the information handling system 100 within the time set at the auto-connect timer, the timer may be ignored as a result of the wireless peripheral device 156 being operatively coupled to the information handling system 100.

It is appreciated that, as the peripheral device microcontroller 158 iteratively attempts to initiate the first wireless connection and then the second wireless connection or other wireless connections via alternatively emitting beacons for those wireless protocols, additional timers may be set such that when one wireless connection is not made, the peripheral device microcontroller 158 moves onto another attempt to use a different wireless connection and wireless beacons to operatively couple the wireless peripheral device 156 to the information handling system 100. In an example embodiment, an RF timeout timer may be set such that after the RF timeout timer has been exceeded, the execution of the out-of-box auto-connection discovery agent 162 causes the peripheral device microcontroller 158 to initiate a wireless connection with the information handling system 100 using the second wireless protocol (e.g., the Bluetooth wireless protocol). It is appreciated that a third wireless protocol or even more wireless protocols may form part of this iterative cycle such that these plurality of wireless protocols are used to emit beacons in an attempt to operatively and wirelessly couple to the wireless peripheral device 156 to the information handling system 100. Still further, in an example embodiment, a BT timeout timer may be set such that after the BT timeout timer has been exceeded, the execution of the out-of-box auto-connection discovery agent 162 causes the peripheral device microcontroller 158 to attempt again to initiate a wireless connection with the information handling system 100 using the first wireless protocol (e.g., the RF protocol) again. In an embodiment, the RF timeout timer may be set to 1 second while the BT timeout timer may be set to 5 seconds. It is appreciated, however, that any length of time may be used as the RF timeout timer and the BT timeout timer. It is appreciated that more that two wireless protocols may be cycled through in some embodiments. For purposes of explanation, two wireless protocols are used in the present disclosure and the present specification contemplates that the other wireless protocols described herein may be among these two wireless protocols or more be added as additional wireless protocols used within the iterative cycle described herein.

In an embodiment, the wireless peripheral device 156 may include a peripheral device wireless connection indicator 164 and a peripheral device wireless connection selector 166. The peripheral device wireless connection indicator 164 may indicate to a user which wireless protocol (e.g., RF protocol or BT wireless protocol) is being used to either initiate the operative coupling of the wireless peripheral device 156 to the information handling system 100 or is currently used to operatively couple the wireless peripheral device 156 to the information handling system 100. Thus, as the peripheral device microcontroller 158 executes the out-of-box auto-connection discovery agent 162 as described herein, the peripheral device wireless connection indicator 164 may indicate which wireless protocol has been initiated and the user may visually see the iterative switching between the first wireless protocol and second wireless protocol according to the systems and methods described herein. Still further, when a wireless connection has been made between the wireless peripheral device 156 and the information handling system 100, the peripheral device wireless connection indicator 164 may light up a specific icon such as a BT icon or RF signal icon on the peripheral device wireless connection indicator 164 using a light-emitting diode (LED) to inform the user as to which wireless protocol is being used by the wireless peripheral device 156 to communicate with the information handling system 100. This selected wireless protocol may then be set as the default wireless protocol during later start-ups of the wireless peripheral device 156 and the execution of the out-of-box auto-connection discovery agent 162 by the wireless peripheral device microcontroller 158 may be disabled or otherwise stopped. The user may then later change among available wireless protocols for the peripheral devices by toggling among the plurality of peripheral device connection indicators 164 and manually pairing with any pairing and wireless coupling procedure known in the art via a newly selected wireless protocol if available.

The peripheral device wireless connection selector 166 may be any button or actuator that allows a user to manually select which wireless protocol to use to operatively couple the wireless peripheral device 156 to the information handling system 100. For example, the peripheral device wireless connection indicator 164 may indicate to the user that the peripheral device microcontroller 158 is iteratively initiating a first wireless connection request via a first wireless protocol and initiating a second wireless connection request via a second wireless protocol different from the first wireless protocol pursuant to the execution of the out-of-box auto-connection discovery agent 162 described herein. The user may visually see this process via the indicators on the peripheral device wireless connection indicator 164 and use the peripheral device wireless connection selector 166 to manually select which wireless protocol to use. This allows the user to stop the out-of-box auto-connection discovery agent 162 from being executed and allow the user to customize the selection of wireless protocol to use to operatively couple the wireless peripheral device 156 to the information handling system 100. The peripheral device wireless connection selector 166 may also allow the user to switch, manually, between the first wireless protocol and second wireless protocol when, for example, a current wireless protocol being used by the wireless peripheral device 156 is needed to operatively couple a different wireless peripheral device 156 to the information handling system 100 for example, after the default wireless protocol was established with the out-of-box auto-connection discovery agent 162. As such, part of the execution of the out-of-box auto-connection discovery agent 162 may include monitoring, by the peripheral device microcontroller 158, whether the user has actuated the peripheral device wireless connection selector 166 during the initial out-of-box set up. Where the user does actuate the peripheral device wireless connection selector 166, the peripheral device microcontroller 158 may stop the execution of the out-of-box auto-connection discovery agent 162 and initiate a wireless connection with the information handling system 100 according to the user's selection on the peripheral device wireless connection indicator 164 by the peripheral device wireless connection selector 166.

The execution of the out-of-box auto-connection discovery agent 162 by the peripheral device microcontroller 158, therefore, simplifies the process of operatively coupling the wireless peripheral device 156 to the information handling system 100. When a user receives the wireless peripheral device 156, the user may take it out of the shipping box and initiate or otherwise turn on the wireless peripheral device 156. This causes the peripheral device microcontroller 158 to automatically execute the out-of-box auto-connection discovery agent 162 such that the user is not required to engage in multiple steps to operatively couple the wireless peripheral device 156 to the information handling system 100. In an embodiment, a wireless RF dongle 174 may be provided with the wireless peripheral device 156 in the box and during the iterative initiation of the first wireless connection request via a first wireless protocol and the initiation of the second wireless connection request via a second wireless protocol different from the first wireless protocol, the user may insert the wireless RF dongle 174 into a universal serial bus (USB) port on the information handling system 100. During the iterative wireless protocol selection, the peripheral device microcontroller 158 may detect the presence of the wireless RF dongle 174 and automatically operatively couple the wireless peripheral device 156 to the information handling system 100 (e.g., via the RF protocol). However, where the wireless RF dongle 174 is not detected, the iterative process may operatively couple the wireless peripheral device 156 to the information handling system 100 using a different wireless protocol (e.g., a BT wireless protocol BLE protocol or other wireless protocol). Indeed, the user then does not have to complete a number of tasks during this automatic coupling process including manually selecting a wireless protocol or mode at the wireless peripheral device 156 and later performing actions at the information handling system 100. Further, the execution of the out-of-box auto-connection discovery agent 162 by the peripheral device microcontroller 158 is not dependent on an OS 116 of the information handling system 100 with the peripheral device microcontroller 158 setting the varying time-controls for different wireless protocols used and prioritizing control of which wireless protocol is used to operatively couple the wireless peripheral device 156 to the information handling system 100. The system and methods described herein, therefore, do not require software or firmware to be executed on the information handling system 100 in order to operatively couple the wireless peripheral device 156 to the information handling system 100. In an embodiment, as the out-of-box auto-connection discovery agent 162 completes the connection between the wireless peripheral device 156 and the information handling system 100, the out-of-box auto-connection discovery agent 162 may track the connection status, set the selected wireless protocol as default for later operations, and exit the out-of-box auto-connection process described herein when the connection is completed.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
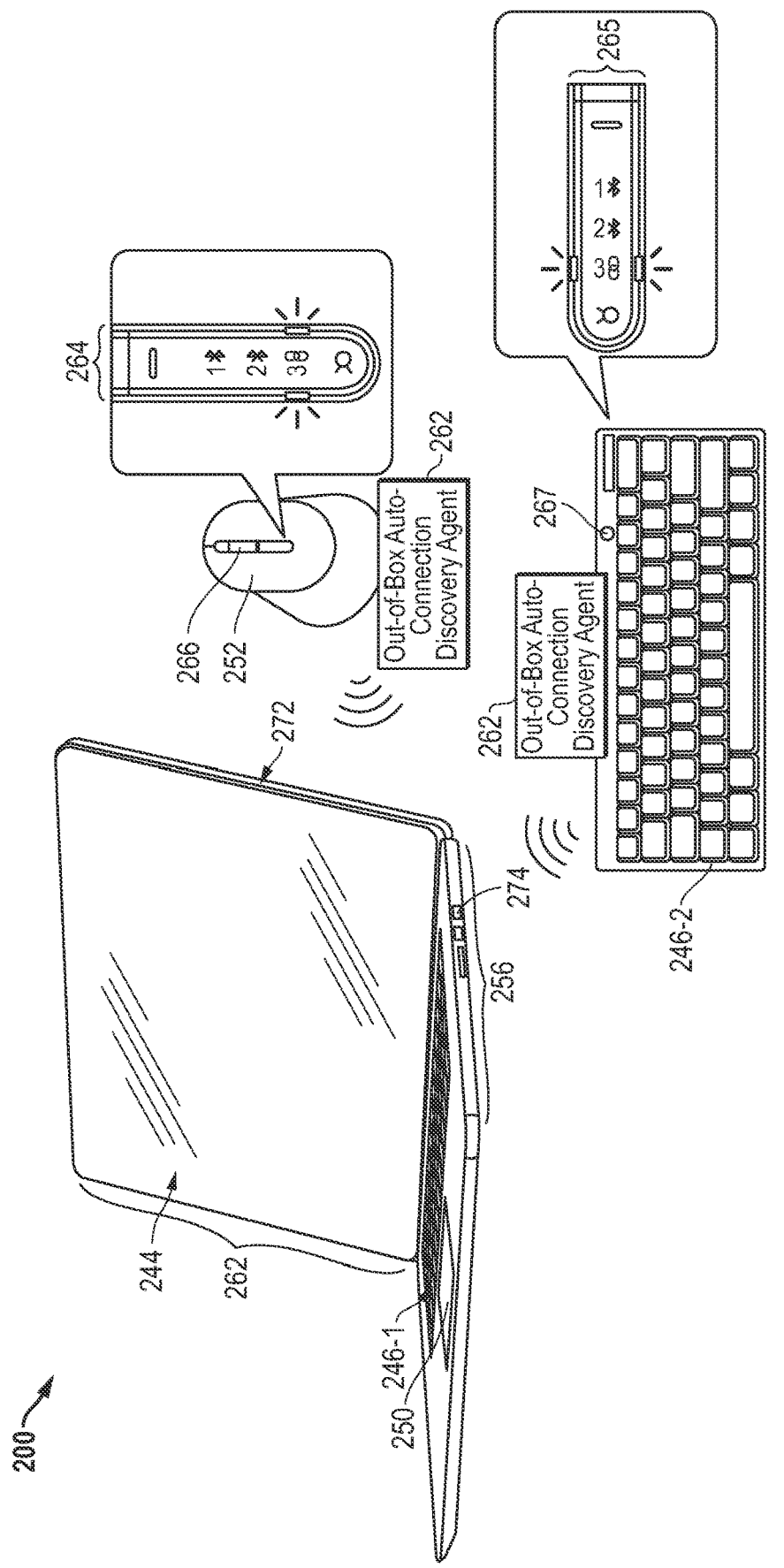
FIG. 2 is a graphic diagram illustrating an information handling system with a peripheral device operatively couplable to the information handling system using one of a plurality of different wireless protocols according to an embodiment of the present disclosure.

FIG. 2 is a graphic diagram illustrating an information handling system with one or more peripheral devices operatively couplable to the information handling system using one of two different wireless protocols according to an embodiment of the present disclosure. The information handling system 200 may, in an example embodiment, be a laptop-type information handling system 200. In the example shown in FIG. 2, the information handling system 200 may include a base chassis 256 that is operatively coupled to a display chassis 262 in an embodiment. As shown in FIG. 2, the information handling system 200 may include a video display device 244, a built-in keyboard 246-1, a trackpad 250, and other components internal to the information handling system 200.

As described herein, the information handling system 200 may be operatively coupled to one or more wireless peripheral devices (e.g., 252 or 246-2). FIG. 2 shows two examples of a wireless peripheral device: a wireless mouse 252 and a wireless keyboard 246-2. Although the information handling system 200 shown in FIG. 2 includes a built-in keyboard 246-1, a wireless keyboard 246-2 may be used when, for example, the information handling system 200 has been operatively coupled to a docking station or comfort otherwise dictates that a wireless keyboard 246-2 will be used by the user. The present specification, however, contemplates that any other types of wireless peripheral device may be used and the processes, systems, and methods may equally apply to the automatic coupling of these wireless peripheral devices to the information handling system 200 as described herein.

In an embodiment, the wireless keyboard 246-2 and/or wireless mouse 252 includes a wireless peripheral device radio (not shown), wireless peripheral device RF front end (not shown), and one or more wireless device antennas (not shown) used to wirelessly communicate with the information handling system 200. According to the operation of the out-of-box auto-connection discovery agent 262 as described herein, one of the wireless device antennas may be used to operatively couple the wireless keyboard 246-2 and/or wireless mouse 252 to the information handling system 200 using one of a plurality of wireless protocols. These wireless protocols may include a Bluetooth® wireless protocol, radio frequency (RF) protocol that may be a proprietary RF wireless WPAN or WLAN protocol such as Dell Pair® or Microsoft Swift Pair® or another wireless RF protocol such as 5G WPAN or others, or any other type of protocol that may be used to operatively couple the wireless peripheral device to the information handling system 200. For example, the Bluetooth wireless protocol may include a classic BT protocol, a BLE, or other types of Bluetooth® protocols. In an embodiment, the information handling system 200 may or may not include a wireless interface adapter that includes a BT-capable radio (not shown), RF front end (not shown), and antennas (not shown). The wireless peripheral device radio and wireless peripheral device RF front end of each of the wireless keyboard 246-2 and/or wireless mouse 252 may, therefore, communicate with this BT capable circuitry in the information handling system 200 using one of the plurality of wireless device antennas housed within the housing of each of the wireless keyboard 246-2 and/or wireless mouse 252.

In an embodiment, when the wireless keyboard 246-2 and/or wireless mouse 252 are operatively coupled to the information handling system 200 via a BT connection, the wireless keyboard 246-2 and/or wireless mouse 252 may communicate with the information handling system 200 using any band, channel, and/or radio frequency associated with the BT or BLE communication protocols including, but not limited to, a radio frequency spectrum in the 2.402 GHz to 2.480 GHz range as well as other current or anticipated BT and BLE frequencies. In an embodiment, when the wireless keyboard 246-2 and/or wireless mouse 252 are operatively coupled to the information handling system 200 via an RF protocol that is proprietary such as Dell Pair® or Microsoft Swift Pair® or another wireless RF protocol such as WPAN protocols or others, the wireless peripheral device radio, wireless peripheral device RF front end, and wireless device antennas of each of the wireless keyboard 246-2 and/or wireless mouse 252 may communicate with a wireless RF dongle 274 that may include an internal antenna (not shown) capable of communicating with the wireless peripheral device radio of each of the wireless keyboard 246-2 and/or wireless mouse 252. Again, it is appreciated that, in one embodiment, the RF discovery process involved between the wireless peripheral device (e.g., 252, 246-2) and the information handling system 200 comprises the wireless peripheral device acknowledging the connection between the wireless peripheral device and the information handing system 200 as a result of the RF dongle 274 being pre-paired with the wireless peripheral device prior to shipping of the wireless peripheral device and RF dongle. As such, the operative wireless coupling of the wireless peripheral device to the information handling system 200 is a result of this pre-pairing process such that, where available, the RF dongle 274 may acknowledge the connection between the wireless peripheral device and information handling system 200 without initiating a typical pairing process. It is appreciated that, in some embodiments, a wireless RF dongle 274 may not be used and the information handling system 200 may communicate with the wireless keyboard 246-2 and/or wireless mouse 252 via an RF antenna operatively coupled to the radio and RF front end of the information handling system 200. The RF protocol may also include Wi-Fi®, near-field communication (NFC) protocol, other WPAN protocols, or the like. It is appreciated, however, that the wireless communication protocols associated with the BT wireless protocol and the RF protocol implement different communication standards that set each apart from the other by the hardware processor (e.g., EC, hardware processor, etc.) when the wireless keyboard 246-2 and/or wireless mouse 252 is transceiving data with the information handling system 200. The usable frequencies associated with the RF protocol may include any radio bands such as 2.400 to 2.485 GHz, 5 GHz, and 6 GHz among other WLAN radio frequency bands.

The wireless keyboard 246-2 and/or wireless mouse 252 also include a peripheral device PMU. For example, the peripheral device PMU may provide power to the peripheral device microcontroller (not shown) and a peripheral device storage device (not shown) as well as other hardware such an optical sensor that detects position changes of the wireless keyboard 246-2 and/or wireless mouse 252 and the like. In an embodiment, the peripheral device PMU may monitor power levels and be electrically coupled to the peripheral device microcontroller to provide this power. The peripheral device PMU may receive data or machine-readable code instructions to regulate power from a power source such as a wireless peripheral device battery (not shown).

The peripheral device microcontrollers of each of the wireless keyboard 246-2 and/or wireless mouse 252, as described herein, also includes a peripheral device storage device (not shown). The peripheral device storage device may be any type of data storage device that, in the embodiments herein, stores code instructions of the out-of-box auto-connection discovery agent 262 to be executed by the peripheral device microcontroller. Execution of the out-of-box auto-connection discovery agent 262 causes the wireless keyboard 246-2 and/or wireless mouse 252 to iteratively initiate a first wireless connection request via transmitting one or more beacon signals in a first wireless protocol and initiate a second wireless connection request via transmitting one or more beacon signals in a second wireless protocol different from the first wireless protocol when the peripheral device is not wirelessly coupled to the information handling system using the first wireless protocol. As described in embodiments herein, the first wireless protocol may be an RF protocol while the second wireless protocol is a Bluetooth wireless protocol. In an embodiment, the selection of initiating, first, a wireless connection using a RF protocol may be done due to the relatively quicker determination as to whether the wireless keyboard 246-2 and/or wireless mouse 252 can be operatively coupled to the information handling system 200 via the first RF protocol than when using a Bluetooth wireless protocol to make that operative coupling. It is appreciated that more than two wireless protocols may also be polled via beacons for additional wireless connection requests in some embodiments.

In an embodiment, the execution of the out-of-box auto-connection discovery agent 262 may initiate an auto-connect timer. The auto-connect timer may be set to determine a length of time that the wireless keyboard 246-2 and/or wireless mouse 252 iteratively attempts to initiate a first wireless connection via beacon in the first wireless protocol and then switch to initiate a second wireless connection via the second wireless protocol and iteratively switch back and forth for a limited period of time. In an embodiment, the auto connect timer limiting switching back and forth may be set to 180 seconds. However, any length of time may be set as the auto-connect timer and the present specification contemplates these other set lengths of time. In an example embodiment, where no connection is made between the wireless keyboard 246-2 and/or wireless mouse 252 and the information handling system 200 using either of the first wireless protocol or second wireless protocol before the auto-connect timer expires, the execution of the out-of-box auto-connection discovery agent 262 may cause the peripheral device microcontroller to place the wireless keyboard 246-2 and/or wireless mouse 252 in a sleep state. However, where a wireless connection is made between the wireless keyboard 246-2 and/or wireless mouse 252 and the information handling system 200 within the time set at the auto-connect timer, the timer may be ignored as a result of the wireless keyboard 246-2 and/or wireless mouse 252 being operatively coupled to the information handling system 200.

It is appreciated that, as the peripheral device microcontroller iteratively attempts to initiate the first wireless connection and then switch to attempt with the second wireless connection, additional timers may be set such that when one wireless connection is not made, the peripheral device microcontroller 158 moves onto another attempt to use a different wireless connection to operatively couple the wireless keyboard 246-2 and/or wireless mouse 252 to the information handling system 200 and then back again or onto an attempt with a third wireless protocol. In one example embodiment, a RF timeout timer may be set such that after the RF timeout timer has been exceeded for attempted with the first wireless protocol (e.g., the proprietary RF protocol), the execution of the out-of-box auto-connection discovery agent 262 causes the peripheral device microcontroller to initiate a wireless connection with the information handling system 200 using the second wireless protocol (e.g., the Bluetooth wireless protocol). Still further, in an example embodiment, a BT timeout timer may be set such that after the BT timeout timer has been exceeded, the execution of the out-of-box auto-connection discovery agent 262 causes the peripheral device microcontroller to attempt again to initiate a wireless connection with the information handling system 200 using the first wireless protocol (e.g., the RF protocol) again or to move to a third wireless protocol. In an embodiment, the RF timeout timer may be set to 1 second while the BT timeout timer may be set to 5 seconds. It is appreciated, however, that any length of time may be used as the RF timeout timer and the BT timeout timer or any additional wireless protocol time out timers.

In an embodiment, the wireless keyboard 246-2 and/or wireless mouse 252 may include a peripheral device wireless connection indicator 264 or 265 and a peripheral device wireless connection selector 266 or 267. The peripheral device wireless connection indicator 264 or 265 may indicate to a user which wireless protocol (e.g., RF protocol or BT wireless protocol) is being used to either attempt to initiate the operative coupling of the wireless keyboard 246-2 and/or wireless mouse 252 to the information handling system 200 or is currently used to operatively couple the wireless keyboard 246-2 and/or wireless mouse 252 to the information handling system 200. Thus, as the peripheral device microcontroller executes the out-of-box auto-connection discovery agent 262 as described herein, the peripheral device wireless connection indicator 264 or 265 may indicate which wireless protocol has been initiated and the user may visually see the iterative switching between the first wireless protocol and second wireless protocol or other wireless protocols according to the systems and methods described herein. Still further, when a wireless connection has been made between the wireless keyboard 246-2 and/or wireless mouse 252 and the information handling system 200, the peripheral device wireless connection indicator 264 or 265 may light up a specific icon such as a BT icon or RF signal icon on the peripheral device wireless connection indicator 264 or 265 using a light-emitting diode (LED) to inform the user as to which wireless protocol is being used by the wireless keyboard 246-2 and/or wireless mouse 252 to communicate with the information handling system 200.

The peripheral device wireless connection selector 266 or 267 may be any button or actuator that allows a user to manually select which wireless protocol to use to operatively couple the wireless keyboard 246-2 and/or wireless mouse 252 to the information handling system 200. For example, the peripheral device wireless connection indicator 264 or 265 may indicate to the user that the peripheral device microcontroller of each of the wireless keyboard 246-2 and/or wireless mouse 252 is iteratively initiating a first wireless connection request via a first wireless protocol or initiating a second wireless connection request via a second wireless protocol different from the first wireless protocol pursuant to the execution of the out-of-box auto-connection discovery agent 262 described herein. The user may visually see this process via the indicators on the peripheral device wireless connection indicator 264 or 265 and use the peripheral device wireless connection selector 266 or 267 to manually select which wireless protocol to use. This allows the user to stop the out-of-box auto-connection discovery agent 262 from being executed and allow the user to customize the selection of wireless protocol to use to operatively couple the wireless keyboard 246-2 and/or wireless mouse 252 to the information handling system 200. The peripheral device wireless connection selector 266 or 267 may also allow the user to switch, manually, between the first wireless protocol and second wireless protocol or other wireless protocols when, for example, a current wireless protocol being used by the wireless keyboard 246-2 and/or wireless mouse 252 is needed to operatively couple a different wireless peripheral device (e.g., wireless trackpad, wireless stylus, etc.) to the information handling system 200. As such, part of the execution of the out-of-box auto-connection discovery agent 262 may include monitoring, by the peripheral device microcontroller, whether the user has actuated the peripheral device wireless connection selector 266 or 267. Where the user does actuate the peripheral device wireless connection selector 266 or 267, the peripheral device microcontroller may stop the execution of the out-of-box auto-connection discovery agent 262 and initiate a wireless connection with the information handling system 200 according to the user's selection on the peripheral device wireless connection indicator 264 or 265 by the peripheral device wireless connection selector 266 or 267.

The execution of the out-of-box auto-connection discovery agent 262 by the peripheral device microcontroller of the wireless keyboard 246-2 and/or wireless mouse 252, therefore, simplifies the process of operatively coupling the wireless keyboard 246-2 and/or wireless mouse 252 to the information handling system 200. When a user receives the wireless keyboard 246-2 and/or wireless mouse 252, the user may take it out of the shipping box and initiate or otherwise turn on the wireless keyboard 246-2 and/or wireless mouse 252. This causes the peripheral device microcontroller of each of the wireless keyboard 246-2 and/or wireless mouse 252 to automatically execute the out-of-box auto-connection discovery agent 262 such that the user is not required to engage in multiple steps to operatively couple the wireless keyboard 246-2 and/or wireless mouse 252 to the information handling system 200. In an embodiment, a wireless RF dongle 274 may be provided with the wireless keyboard 246-2 and/or wireless mouse 252 in the box. During the iterative initiation of the first wireless connection request via a first wireless protocol and the initiation of the second wireless connection request via a second wireless protocol different from the first wireless protocol, the user may insert the wireless RF dongle 274 into a USB port, for example, on the information handling system 200. During the iterative wireless protocol selection with the out-of-box auto-connection discovery agent 262, the peripheral device microcontroller may detect the presence of the wireless RF dongle 274 and automatically operatively couple the wireless keyboard 246-2 and/or wireless mouse 252 to the information handling system 200 (e.g., via the RF protocol). However, where the wireless RF dongle 274 is not detected, the iterative process of the out-of-box auto-connection discovery agent 262 may transmit a beacon from the wireless keyboard 246-2 and/or wireless mouse 252 to the information handling system 200 using a different wireless protocol (e.g., a BT wireless protocol) to see if such a pairing is available. Indeed, the user does not have to complete a number of tasks during this automatic coupling process including manually selecting a wireless protocol or mode at the wireless keyboard 246-2 and/or wireless mouse 252 and later performing actions at the information handling system 200. Further, the execution of the out-of-box auto-connection discovery agent 262 by the peripheral device microcontroller is not dependent on an OS of the information handling system 200 with the peripheral device microcontroller setting the varying time-controls for different wireless protocols used and prioritizing control of which wireless protocol is used to operatively couple the wireless keyboard 246-2 and/or wireless mouse 252 to the information handling system 200. The system and methods described herein, therefore, do not require software or firmware to be executed on the information handling system 200 in order to operatively couple the wireless keyboard 246-2 and/or wireless mouse 252 to the information handling system 200. In an embodiment, as the out-of-box auto-connection discovery agent 262 completes the connection between the wireless keyboard 246-2 and/or wireless mouse 252 and the information handling system 200 with a selected type of wireless protocol, the out-of-box auto-connection discovery agent 262 may track the connection status, establish the selected type of wireless protocol as a default for the wireless peripheral device, and exit the out-of-box auto-connection process described herein when the connection is completed.

Figure 3:
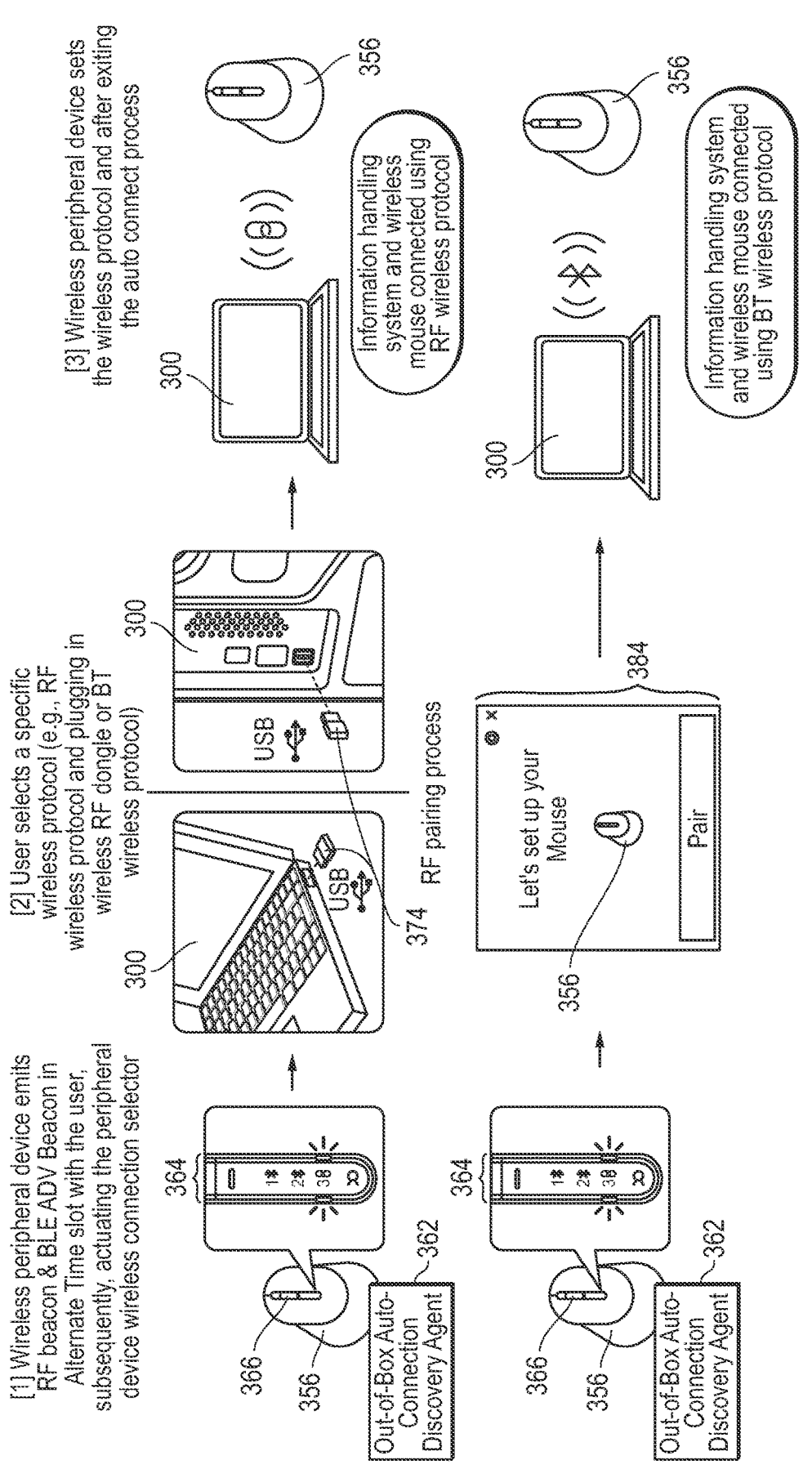
FIG. 3 is a graphic diagram illustrating a peripheral device operatively couplable to the information handling system executing an out-of-box auto-connection discovery agent and using one of a plurality of different wireless protocols according to an embodiment of the present disclosure.

FIG. 3 is a graphic diagram illustrating a wireless peripheral device operatively couplable to the information handling system 300 showing auto-connection with either of two different wireless protocols as selected by a user and determined with execution of code instructions for the out-of-box auto-connection discovery agent according to an embodiment of the present disclosure. In the shown embodiment, the wireless peripheral device 356 is a wireless mouse. As described herein, the wireless peripheral device 356 may include a peripheral device wireless connection indicator 364 and a peripheral device wireless connection selector 366. The peripheral device wireless connection indicator 364 may indicate to a user which wireless protocol (e.g., RF protocol or BT wireless protocol) is being used to either initiate the operative coupling of the wireless peripheral device 356 to the information handling system 300 or is currently used to operatively couple the wireless peripheral device 356 to the information handling system 300. Thus, as the peripheral device microcontroller (not shown) of the wireless peripheral device 356 executes the out-of-box auto-connection discovery agent 362 as described herein, the peripheral device wireless connection indicator 364 may indicate which wireless protocol has been initiated and the user may visually see the iterative switching between the first wireless protocol and second wireless protocol via execution of the out-of-box auto-connection discovery agent according to the systems and methods described herein. Still further, when a wireless connection has been made between the wireless peripheral device 356 and the information handling system 300, the peripheral device wireless connection indicator 364 may light up a specific icon such as a BT icon or RF signal icon on the peripheral device wireless connection indicator 364 using a LED to inform the user as to which wireless protocol is being used by the wireless peripheral device 356 to communicate with the information handling system 300.

However, as described herein, the user may actuate a peripheral device wireless connection selector 366 in order to circumvent or stop the execution of the out-of-box auto-connection discovery agent 362 by the microcontroller of the wireless peripheral device 356. This may, instead of automatically coupling the wireless peripheral device 356 to the information handling system 300, require the user to further engage with additional manual steps to select a wireless protocol, pair with that wireless protocol, and complete the operative coupling of the wireless peripheral device 356 to the wireless peripheral device 356 via a peripheral device wireless connection selector switch 366 and according to methods understood in the art for wireless protocols. The peripheral device wireless connection selector 366 may be any button or actuator that allows a user to manually select which wireless protocol to use to operatively couple the wireless peripheral device 356 to the information handling system 300.

The peripheral device wireless connection indicator 364 may indicate to the user that the peripheral device microcontroller is executing the out-of-box auto-connection discovery agent 362 to iteratively initiate between a first wireless connection request beacon via a first wireless protocol and initiating a second wireless connection request via a second wireless protocol different from the first wireless protocol if the wireless protocol is not connected as described in embodiments herein. The iteratively active wireless protocol may be indicated by the peripheral device wireless connection indicator 364. The user may visually see this process via the indicators on the peripheral device wireless connection indicator 364. The user may alternatively use the peripheral device wireless connection selector 366 to manually select which wireless protocol to use. This allows the user to stop the out-of-box auto-connection discovery agent 362 from being executed and allow the user to customize the selection of wireless protocol used to operatively couple the wireless peripheral device 356 to the information handling system 300.

As shown in FIG. 3, a RF wireless protocol may be used to operatively couple the wireless peripheral device 356 to the information handling system 300 when the execution of the out-of-box auto-connection discovery agent 362 detects a response signal to a first wireless connection request beacon for the first wireless protocol from the information handling system. While the out-of-box auto-connection discovery agent 362 is executed at the wireless peripheral device 356, a wireless RF dongle 374 may be inserted into a USB port of the information handling system 300 by the user. The insertion of the wireless RF dongle 374 into the USB port allows the wireless radio (not shown) of the wireless peripheral device 356 to receive a response signal and then be automatically operatively coupled to the information handling system 300 by the radio being operatively couplable to the wireless RF dongle 374. This indicates that the RF wireless protocol has been selected by the user. This results in the wireless peripheral device 356 initiating a connection mode in order to complete this coupling of the wireless peripheral device 356 to the information handling system 300 using the RF wireless protocol.

In another example embodiment, the user may forgo inserting the RF dongle 374 into the USB port or may do so at a later time which causes the first timeout timer to be exceeded and the execution of the out-of-box auto-connection discovery agent 362 iteratively switch to initiate a wireless coupling with a second wireless connection request beacon for the second wireless protocol, such as a BT wireless protocol, to be transmitted by the wireless peripheral device 356 to the information handling system 300 via a second wireless protocol. Where present, a BT antenna within the information handling system 300 may detect the initial BT signal or beacon from the wireless radio of the wireless peripheral device 356 and start up the process to operatively couple the wireless peripheral device 356 to the information handling system 300. The process may include presenting a graphical user interface (GUI) 384 to the user indicating that the wireless peripheral device 356 is being operatively coupled to the information handling system 300 via the BT wireless protocol. This GUI 384 may provide any instructions or indications requesting that the user agree to pair the wireless peripheral device 356 to be operatively coupled to the information handling system 300 with an second wireless protocol (or other wireless protocol if applicable). For example, the GUI 384 may notify the user that the wireless peripheral device 356 is attempting to couple with the information handling system 300 and request the user to provide input indicating that the process is to continue to pair. When the user provides this information to the information handling system 300, the wireless peripheral device 356 may provide a response signal to the second wireless connection request beacon for the second wireless protocol. Then the wireless peripheral device may be paired and be operatively coupled to the information handling system 300 using the BT wireless protocol. This may be done with a fast pairing process. It is appreciated, therefore, that a series of manual steps associated with operatively coupling the wireless peripheral device 356 to the information handling system 300 either via the RF wireless protocol or BT wireless protocol may be avoided if the user does not to actuate the peripheral device wireless connection selector 366 and allows the execution of the out-of-box auto-connection discovery agent 362 to detect selection and automatically couple the wireless peripheral device 356 to the information handling system 300 as described herein.

In one embodiment, the peripheral device wireless connection selector 366 may also allow the user to switch, manually, between the first wireless protocol and second wireless protocol or other wireless protocols descried herein when, for example, a current wireless protocol being used by the wireless peripheral device 356 is needed to operatively couple a different wireless peripheral device 356 to the information handling system 300. By actuating the peripheral device wireless connection selector 366 and referencing the peripheral device wireless connection indicator 364, the user may manually select a specific wireless protocol to use to operatively couple the wireless peripheral device 356 the information handling system 300 causing the wireless peripheral device microcontroller to stop the execution of the out-of-box auto-connection discovery agent 362. Where the user does not actuate the peripheral device wireless connection selector 366, the wireless peripheral device 356 may be operatively coupled to and remain operatively coupled to the information handling system 300 via the automatically selected wireless protocol (e.g., RF wireless protocol or BT wireless protocol) as described herein.

Figure 4:
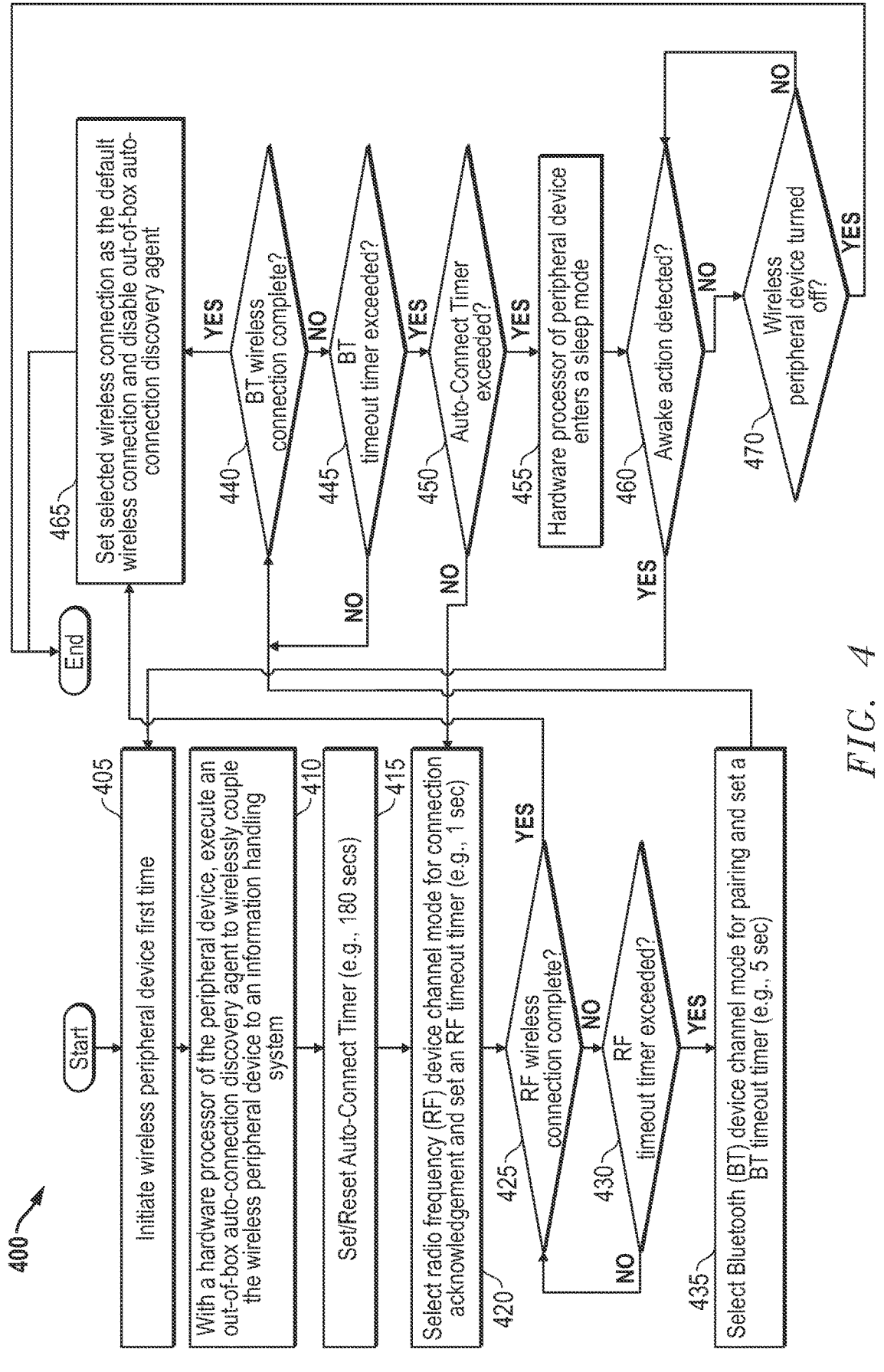
FIG. 4 is a flow diagram illustrating a method of operatively coupling a wireless peripheral device with execution of an out-of-box auto-connection discovery agent to an information handling system according to an embodiment of the present disclosure.

FIG. 4 is a flow diagram illustrating a method 400 of operatively connecting a wireless peripheral device to an information handling system according to an embodiment of the present disclosure. As described herein, the method 400 includes the execution of the out-of-box auto-connection discovery agent by a peripheral device microcontroller of the wireless peripheral device allows for the automatic connection of the wireless peripheral device to the information handling system. In an embodiment, the microcontroller executes the out-of-box auto-connection discovery agent to automatically couple the wireless peripheral device to an information handling system by iteratively initiating a first wireless connection request beacon via a first wireless protocol and then initiating a second wireless connection request beacon via a second wireless protocol different from the first wireless protocol when the peripheral device is not wirelessly coupled to the information handling system using the first wireless protocol. This iterative generation of beacons between the first wireless protocol and the second wireless protocol and any additional wireless protocols continues to cycle until a wireless coupling occurs or an auto-connect timeout timer expires.

At block 405, the method 400 includes initiating the wireless peripheral device. In an embodiment, the user may unbox a new wireless peripheral device and initiate the wireless peripheral device by actuating a button or switch that allows power to be provided to, at least, the peripheral device microcontroller. This initiating the wireless peripheral device may allow the peripheral device PMU to provide power to the peripheral device microcontroller via a wireless peripheral device battery.

The method 400, at block, 410, may include executing the out-of-box auto-connection discovery agent with the peripheral device microcontroller to wirelessly couple the wireless peripheral device to the information handling system. As described herein, potential wireless protocols may include one or more Bluetooth wireless protocols, proprietary radio frequency (RF) protocols, or any other type of protocol used to operatively couple the wireless peripheral device to the information handling system. For example, the Bluetooth wireless protocol may include a classic Bluetooth® protocol, a Bluetooth® Low Energy (BLE), or other types of Bluetooth® (BT) protocols. The RF protocol may include a proprietary RF protocol such as Dell Pair® or Microsoft Swift Pair® or another wireless RF protocol such as a WPAN protocol, Wi-Fi®, near-field communication (NFC) protocol, or the like. It is appreciated, however, that the wireless communication protocols associated with a BT wireless protocol, an RF protocol and any other wireless protocol, implements different communication standards that set each apart from each other by the hardware processor when the wireless peripheral device is transceiving data with the information handling system.

The method 400 further includes setting/resetting an auto-connect timer at block 415. The auto-connect timeout timer may be set to determine a length of time that the wireless peripheral device iteratively transmit beacons to attempt to initiate a first wireless connection via the first wireless protocol or initiate a second wireless connection via the second wireless protocol. In an embodiment, the auto-connect timeout timer may be set to 180 seconds. However, any length of time may be set as the auto-connect timeout timer and the present specification contemplates these other set lengths of time.

At block 420, the method 400 includes the wireless peripheral device selecting an RF device channel mode for transmitting beacons for connection acknowledgement of the wireless peripheral device to the information handling system. It is appreciated that, in one embodiment, the RF discovery process involved between the wireless mouse and the information handling system comprises the wireless mouse acknowledging the connection between the wireless mouse and the information handing system as a result of the RF dongle being pre-paired with the wireless mouse prior to shipping of the wireless mouse and RF dongle. As such, the operative wireless coupling of the wireless mouse to the information handling system is a result of this pre-pairing process such that, where available, the RF dongle may acknowledge the connection between the wireless mouse and information handling system without initiating a typical pairing process. Again, this RF device channel mode includes the wireless peripheral device transmitting an RF signal beacon with connection request in a proprietary or other RF wireless protocol in an attempt to operatively couple the wireless peripheral device to the information handling system. In an embodiment, an RF wireless protocol may be selected first during this iterative process of the out-of-box auto-connection discovery agent because the RF protocol takes relatively less time to complete the connection process with a wireless RF dongle if plugged into the the information handling system than establishing a BT connection under a BT wireless protocol. However, the present specification contemplates that any of the other wireless protocols available for the wireless peripheral device may be the initial wireless protocol chosen as block 420.

The method 400 also includes setting an RF timeout timer at block 420. In an example embodiment, an RF timeout timer may be set such that after the RF timeout timer has been exceeded, the execution of the out-of-box auto-connection discovery agent causes the peripheral device microcontroller to switch from seeking connection with the first wireless protocol and cycle to initiate a wireless connection with connection request beacons to the information handling system using the second wireless protocol (e.g., the Bluetooth wireless protocol). In an embodiment, this RF timeout timer may be sufficient to allow an initial transmission of an RF signal beacon to be received and processed at a wireless RF dongle when the wireless RF dongle is present and a connection response received, if any. In an embodiment, this RF timeout timer may be set to 1 second though any duration may be used.

At block 425, the method 400 includes determining whether an RF wireless connection has been completed. In an embodiment, the RF wireless connection may not be completed when the wireless RF dongle, preprogrammed to automatically couple the information handling system to the wireless peripheral device, is not operatively coupled to the information handling system as the USB port. In another embodiment, the RF wireless connection may not be completed when a radio of the information handling system is incapable of or not enabled for transmitting an RF signal response signal to the RF connection request beacon and, consequently, operatively coupling the wireless peripheral device to the information handling system via an RF wireless protocol does not occur. In an embodiment, the wireless RF dongle included in the box may not have been selected to plug in. In other embodiment, the RF wireless protocol channels of an internal radio may be already occupied with another wireless peripheral device. Where, at block 425, the wireless peripheral device is paired via the proprietary wireless protocol and the RF wireless connection is completed, the process may proceed to block 465 with the wireless peripheral device being operatively coupled to the information handling system using an RF wireless protocol. At this point, at block 465, the wireless peripheral device microcontroller may set the selected wireless connection (e.g., RF wireless connection) as the default wireless connection. The wireless peripheral device microcontroller may also disable the execution of the out-of-box auto-connection discovery agent such that it is not activated on a subsequent powering on of the wireless peripheral device. Then the process may end.

Where, at block 430, the RF wireless connection is not completed and no response to the RF connection request beacon has been received, the method 400 continues to block 430 with determining whether the RF timeout timer had been exceeded. Where the RF timeout timer has not been exceeded, the method 400 returns to block 425 to continue monitoring for a response signal to the RF connection request beacon until the RF timeout timer has been exceeded. Where, at block 430, the peripheral device microcontroller has determined that the RF timeout timer has been exceeded, the method 400 proceeds to block 435. At block 435, a BT device channel mode may be selected for transmitting one or more BT connection request beacons to the information handling system for pairing. Again, this BT device channel mode includes the wireless peripheral device transmitting a BT signal beacon in the BT wireless protocol that is available or next in order of the cycle in an attempt to operatively couple the wireless peripheral device to the information handling system.

The method 400 also includes setting a BT timeout timer at block 435. In an embodiment, the BT timeout timer may be set to 5 seconds. It is appreciated, however, that any length of time may be used as the RF timeout timer and the BT timeout timer.

At block 440, the method 400 includes determining whether a response to the BT connection request is received and then the BT wireless connection has been completed. A BT wireless connection may not be completed where the radio of the information handling system is incapable of transceiving or is not enabled to transceive data with the wireless peripheral device using a BT wireless protocol, in an embodiment. For example, the BT wireless protocol channel of an internal radio may be already occupied with another wireless peripheral device which may prevent the operative coupling of the wireless peripheral device to the information handling system. Still further, the pairing process under the BT wireless protocol may be initiated but the user has not accepted to "pair" the wireless peripheral device to the information handling system via a GUI (e.g., FIG. 3, GUI 356) which may also prevent the operative coupling of the wireless peripheral device to the information handling system. Still further, other issues may arise where the operative coupling of the wireless peripheral device to the information handling system is prevented. Where the BT wireless connection has been completed and the wireless peripheral device is BT paired with the information handling system at block 440, the method 400 may continue to block 465 as described herein. At block 465, the wireless peripheral device microcontroller may set the selected wireless connection (e.g., BT wireless connection) as the default wireless connection. The wireless peripheral device microcontroller may also disable the execution of the out-of-box auto-connection discovery agent such that it is not activated on a subsequent powering on of the wireless peripheral device.

At block 445 the peripheral device microcontroller may determine whether the BT timeout timer has been exceeded or not without a response for BT wireless protocol pairing. Where the BT timeout timer has not been exceeded, the method proceeds back to block 440 to continue to monitor for a response to the BT connection request beacon and until either the BT wireless connection has been completed at block 440 or the BT timeout timer has been exceeded at block 445. Where the BT timeout timer has been exceeded at block 445, the method 400 continues to block 450.

At block 450, the peripheral device microcontroller may determine whether the auto-connect timer set at block 415 has been exceeded. In an embodiment where the auto-connect timer has not been exceeded, the method 400 returns to bock 420 to, once again, select an RF device channel mode for transmitting as RF protocol connection request beacon for connecting the wireless peripheral device to the information handling system. This method 400 allows the wireless peripheral device to iteratively initiate the first wireless connection request beacon via a first wireless protocol and initiate a second wireless connection request beacon via a second wireless protocol different from the first wireless protocol when the peripheral device has not been wirelessly coupled to the information handling system using the first wireless protocol. This iterative process may continue back and forth or through the cycle until the auto-connect timer has been exceeded. In another example embodiment, a third or more wireless protocols (e.g., BLE, WiFi, and others) may be placed within the cycle which allows the wireless peripheral device microcontroller, when executing the out-of-box auto-connection discovery agent to cycle through not only the RF wireless protocols and BT protocols, but also these other types of wireless protocols. Again, each of the attempts to connect via these additional types of may also cause the wireless peripheral device microcontroller to set a timeout timer that, when exceeded, causes the wireless peripheral device microcontroller to cycle to another wireless protocol within the cycle.

Where the auto-connect timer has been exceeded, the hardware processor (e.g., peripheral device microcontroller) of the wireless peripheral device may enter into a sleep mode at block 455. This conserves electrical energy at the wireless peripheral device battery so that the iterative process of initiating the first wireless connection and then the second wireless connection does not continue indefinitely where no connection is possible.

In an embodiment, in order to restart the execution of the out-of-box auto-connection discovery agent by the peripheral device microcontroller, the user may execute an awake action at the wireless peripheral device. At block 460, the detection of the awake action may cause the method 400 to proceed to block 405 once again with the initiation of the wireless peripheral device and continue with the method 400 as described herein. An awake action may include an actuation of a button at the wireless peripheral device, movement of the wireless peripheral device, or other input provided by the user at the wireless peripheral device. For example, where the wireless peripheral device is as wireless mouse, movement of the wireless mouse, actuation of a mouse button, or rolling of a scrolling wheel may all be used to once again wake the wireless mouse and cause the peripheral device microcontroller to execute the out-of-box auto-connection discovery agent as described herein. Where no awake action from the user is detected, the method 400 proceeds to block 470 to determine if the wireless peripheral device is turned off. If the wireless peripheral device microcontroller determines, at block 470 that wireless peripheral device is turned off, the method 400 may end. Where it is determined by the wireless peripheral device microcontroller that the wireless peripheral device is not turned off at block 470, the process may return to block 460 to continue to monitor for a wake action.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless peripheral device comprising:
  a microcontroller;
  a memory device; and
  a peripheral device power management unit (PMU) to provide power to the microcontroller and the memory device;
  the microcontroller to execute code instructions of an out-of-box auto-connection discovery agent to automatically select and couple the wireless peripheral device to an information handling system upon initially powering up by iteratively:
    initiating a first wireless connection request beacon via a first wireless protocol; and initiating a second wireless connection request beacon via a second wireless protocol different from the first wireless protocol when the peripheral device is not wirelessly coupled to the information handling system using the first wireless protocol, wherein the microcontroller sets an auto-connection timer to time out the iterative switching back and forth between the first wireless protocol and second wireless protocol when no wireless connection is established between the wireless peripheral device and the information handling system.

2. The wireless peripheral device of claim 1 further comprising:

a peripheral device wireless connection indicator formed onto a housing of the peripheral device indicating which of the first wireless protocol or second wireless protocol is iteratively sending the first wireless connection request beacon or the second wireless connection request beacon to initiate operative coupling of the wireless peripheral device to the information handling system.

3. The wireless peripheral device of claim 1 further comprising:

a peripheral device wireless connection selector to receive input from a user via a selector button to select one of the first wireless protocol or the second wireless protocol to operatively couple the wireless peripheral device to the information handling system and stop execution of the code instructions of the out-of-box auto-connection discovery agent to prevent the out-of-box auto-connection discovery agent from iteratively requesting and automatically initiating the coupling of the wireless peripheral device to the information handling system.

4. The wireless peripheral device of claim 1 further comprising:

a proprietary radio frequency (RF) protocol dongle included with the wireless peripheral device, wherein the first wireless protocol is a proprietary RF protocol used by the proprietary RF protocol dongle when operatively coupled to the information handling system; and the microcontroller receives a response signal from the RF protocol dongle to the first wireless connection request beacon as an indication of selection choice to use the proprietary RF protocol with the information handling system.

5. The wireless peripheral device of claim 1 further comprising:

a Bluetooth (BT) antenna and BT radio, wherein the second wireless protocol is a BT wireless protocol used by the BT antenna and BT radio to operatively couple the wireless peripheral device to the information handling system; and the microcontroller receives a response signal from the information handling system to the first wireless connection request beacon as an indication to pair under the BT wireless protocol with the information handling system.

6. The wireless peripheral device of claim 1 further comprising:

the microcontroller to set a first timeout timer such that exceeding the first timeout timer automatically causes the microcontroller to switch from initiating the first wireless connection request beacon to initiating the second wireless connection request beacon for the second wireless protocol.

7. The wireless peripheral device of claim 1 further comprising:

the microcontroller to set a second timeout timer such that exceeding the second timeout timer automatically causes the microcontroller to switch from initiating the second wireless connection request beacon to reinitiating the first wireless connection request beacon for the first wireless protocol.

8. The wireless peripheral device of claim 1 further comprising:

the microcontroller to set a second timeout timer such that exceeding the second timeout timer automatically causes the microcontroller to switch from initiating the second wireless connection request beacon to initiating a third wireless connection request beacon for a third wireless protocol.

9. The wireless peripheral device of claim 1 further comprising:

the microcontroller to place the wireless peripheral device into a sleep state when an auto-connection timer times out with no response to either of repeated instances of the first wireless connection request beacons or the second wireless connection request beacons from iterative switching by the out-of-box auto-connection discovery agent.

10. A method of operatively connecting a wireless peripheral device to an information handling system comprising:

with a microcontroller of the wireless peripheral device executing code instructions of an out-of-box auto-connection discovery agent upon initially powering up to automatically select and couple the wireless peripheral device to an information handling system;

iteratively initiating a first wireless connection request beacon via a first wireless protocol;

iteratively initiating a second wireless connection request beacon via a second wireless protocol different from the first wireless protocol when the wireless peripheral device has not received a response signal to the first wireless connection request beacon from the information handling system in the first wireless protocol after a first timeout timer has expired; and iteratively switching back to reinitiating the first wireless connection request beacon via the first wireless protocol after a second timeout timer has expired, where the out-of-box auto-connection discovery agent iteratively switches back and forth until the microcontroller detects an automatic selection of the first wireless protocol or the second wireless protocol by a user.

11. The method of claim 10 further comprising:

lighting a peripheral device wireless connection indicator formed onto a housing of the peripheral device to indicate which of the first wireless protocol or second wireless protocol is currently sending the first wireless connection request beacon or the second wireless connection beacon to initiate operative coupling of the wireless peripheral device to the information handling system.

12. The method of claim 10 further comprising:

executing a peripheral device wireless connection selector with the microcontroller to receive input from the user to select one of the first wireless protocol or the second wireless protocol initiate manual coupling of the wireless peripheral device to the information handling system and stop execution of code instructions of the out-of-box auto-connection discovery agent from automatically selecting and coupling the wireless peripheral device to the information handling system.

13. The method of claim 10, wherein the first wireless protocol is a proprietary radio frequency (RF) protocol used with a dongle operatively couplable to the information handling system, and wherein the second wireless protocol is a Bluetooth® (BT) wireless protocol.

14. The method of claim 9 further comprising:

setting an auto-connection timer via the microcontroller to time out the iterative switching between the first wireless connection and second wireless connection when no wireless connection is established between the wireless peripheral device and the information handling system; and placing the wireless peripheral device into a sleep state when the auto-connection timer times out.

15. The method of claim 9, wherein the first wireless protocol is a proprietary RF protocol used by a proprietary RF protocol dongle included with the wireless peripheral device and operatively couplable to the information handling system, and wherein the microcontroller receives a response signal from the proprietary RF protocol dongle to the first wireless connection request beacon as an indication of selection choice to use the proprietary RF protocol with the information handling system automatically when the proprietary RF protocol dongle is operatively coupled to a port of the information handling system.

16. The method of claim 9, wherein the second wireless protocol is a BT wireless protocol used by a BT antenna and BT radio of the wireless peripheral device to operatively couple the wireless peripheral device to the information handling system, and wherein the microcontroller receives a response signal from the information handling system to pair under the BT wireless protocol with the information handling system.

17. A wireless peripheral device wirelessly couplable with an information handling system comprising:

a microcontroller;

a memory device; and a peripheral device power management unit (PMU) to provide power to the microcontroller and the memory device;

the microcontroller to execute code instructions of an out-of-box auto-connection discovery agent to automatically select and couple the wireless peripheral device to an information handling system upon initially powering up by iteratively:

initiating a first wireless connection request beacon via a first wireless protocol; and initiating a second wireless connection request beacon via a second wireless protocol different from the first wireless protocol when the wireless peripheral device has not received a first response signal to the first wireless connection request beacon from the information handling system before a first timeout timer expires;

the microcontroller to reinitiate the first wireless connection request beacon to the first wireless protocol when the wireless peripheral device has not received a second response signal to the second wireless connection request beacon before a second timeout timer expires; and the microcontroller iteratively switching between the first wireless protocol and the second wireless protocol until the microcontroller receives a first response signal or a second response signal indicating automatic selection by a user or until an auto-connection timer expires.

18. The peripheral device of claim 17, wherein the microcontroller sets the auto-connection timer to time out the iterative switching between the first wireless protocol and second wireless protocol when no wireless connection is established between the peripheral device and the information handling system and the wireless peripheral device enters sleep state upon expiration of the auto-connection timer.

19. The peripheral device of claim 17 further comprising:

a peripheral device wireless connection selector to receive input from the user to select one of the first wireless protocol and second wireless protocol to operatively couple the peripheral device to the information handling system and stop the out-of-box auto-connection discovery agent from automatically coupling the peripheral device to the information handling system.

20. The peripheral device of claim 17, wherein the first wireless protocol is a proprietary radio frequency (RF) protocol used with a dongle operatively couplable to the information handling system and the second wireless protocol is a Bluetooth® wireless protocol, and where plugging in the dongle selects the first wireless protocol and where accepting a request to pair via a graphical user interface (GUI) selects the second wireless protocol.

* * * * *